(12) United States Patent
Natroshvili et al.

(10) Patent No.: US 12,043,281 B2
(45) Date of Patent: Jul. 23, 2024

(54) METHOD AND DEVICE FOR OPERATING AN AUTOMATED VEHICLE AT A TRAFFIC INTERSECTION

(71) Applicant: Robert Bosch GmbH, Stuttgart (DE)

(72) Inventors: Koba Natroshvili, Waldbronn (DE); Markus Schuetz, Tuebingen (DE); Thomas Schamm, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/066,778

(22) Filed: Dec. 15, 2022

(65) Prior Publication Data

US 2023/0202514 A1    Jun. 29, 2023

(30) Foreign Application Priority Data

Dec. 23, 2021    (DE) ...................... 10 2021 214 977.4

(51) Int. Cl.
*B60W 60/00*    (2020.01)
*B60W 30/18*    (2012.01)
*B60W 40/04*    (2006.01)

(52) U.S. Cl.
CPC .... *B60W 60/001* (2020.02); *B60W 30/18159* (2020.02); *B60W 40/04* (2013.01); *B60W 2420/00* (2013.01); *B60W 2556/40* (2020.02)

(58) Field of Classification Search
CPC ......... B60W 60/001; B60W 30/18159; B60W 40/04; B60W 2556/40; B60W 2420/00
See application file for complete search history.

(56) References Cited

U.S. PATENT DOCUMENTS

| 11,794,784 B1* | 10/2023 | Taylor | .................... B60W 50/00 |
| 2016/0116916 A1* | 4/2016 | Pink | .......................... G08G 1/16 701/23 |

(Continued)

FOREIGN PATENT DOCUMENTS

| DE | 102013210263 A1 | 12/2014 |
| DE | 102020132302 A1 | 7/2021 |

(Continued)

OTHER PUBLICATIONS

SAE Standard J3016 "Taxonomy and Definitions for Terms Related to On-Road Motor Vehicle Automated Driving Systems," 2014, pp. 1-12.

*Primary Examiner* — Hussein Elchanti
*Assistant Examiner* — Kenneth M Dunne
(74) *Attorney, Agent, or Firm* — NORTON ROSE FULBRIGHT US LLP; Gerard A. Messina

(57) ABSTRACT

A method and device for operating an automated vehicle, including: acquiring an environment of the automated vehicle including the traffic intersection; preparing an environment map based on the acquired environment, the environment map including a subdivision into grid cells, each including occupancy probabilities and velocity distributions; acquiring an updated environment of the automated vehicle; adapting the occupancy probabilities and the velocity distributions for each grid cell; determining the occupancy probabilities and velocity distributions of an expected environment in a next time step; repeatedly executing the steps until a final occupancy probability and a final velocity distribution is determined for each grid cell according to predefined criteria; determining a driving strategy for the automated vehicle as a function of the final occupancy probabilities and the final velocity distributions; and oper- (Continued)

ating the automated vehicle as a function of the driving strategy.

9 Claims, 2 Drawing Sheets

(56) References Cited

U.S. PATENT DOCUMENTS

| | | | | |
|---|---|---|---|---|
| 2017/0137024 | A1* | 5/2017 | Elie | B62D 15/0285 |
| 2019/0047439 | A1* | 2/2019 | Natroshvili | G06V 20/58 |
| 2019/0384309 | A1* | 12/2019 | Silva | G01S 17/931 |
| 2021/0064040 | A1* | 3/2021 | Yadmellat | G07C 5/02 |
| 2022/0410882 | A1* | 12/2022 | Bush | B60W 30/0956 |

FOREIGN PATENT DOCUMENTS

| | | |
|---|---|---|
| DE | 102020200183 A1 | 7/2021 |
| DE | 102021131844 A1 | 6/2022 |
| WO | WO-2022087014 A1 * | 4/2022 |

\* cited by examiner

METHOD AND DEVICE FOR OPERATING AN AUTOMATED VEHICLE AT A TRAFFIC INTERSECTION

CROSS REFERENCE

The present application claims the benefit under 35 U.S.C. § 119 of German Patent Application No. DE 10 2021 214 977.4 filed on Dec. 23, 2021, which is expressly incorporated herein by reference in its entirety.

FIELD

The present invention, among other things, relates to a method for operating an automated vehicle at a traffic intersection, the method including a step of determining a driving strategy for the automated vehicle as a function of occupancy probabilities and velocity distributions, and operating the automated vehicle as a function of the driving strategy.

SUMMARY

A method according to an example embodiment of the present invention for operating an automated vehicle at a traffic intersection includes a step of acquiring an environment of the automated vehicle with the aid of an environment sensor system, the environment including the traffic intersection; and a step of preparing an environment map based on the acquired environment, the environment map including a subdivision into grid cells, each grid cell including occupancy probabilities and velocity distributions. In addition, the method includes a step of acquiring an updated environment of the automated vehicle with the aid of the environment sensor system, a step of adapting the occupancy probabilities and the velocity distributions for each grid cell as a function of the updated environment, a step of determining the occupancy probabilities and velocity distributions of an expected environment in a next time step for each grid cell as a function of the previously adapted occupancy probabilities and the previously adapted velocity distributions, and a repeated execution of these steps.

In addition, the present method includes a step of determining a driving strategy for the automated vehicle as a function of the final occupancy probabilities and the final velocity distributions, and a step of operating the automated vehicle as a function of the driving strategy.

An automated vehicle is to be understood as a partially, highly or fully automated vehicle according to one of the SAE levels 1 to 5 (see SAE standard J3016).

An operation of the automated vehicle as a function of the driving strategy, for instance, is to be understood as the execution of a lateral and/or longitudinal guidance of the automated vehicle. In one possible embodiment of the present invention, for instance, the operation also includes the execution of safety-relevant functions (activating an airbag, locking seatbelts, etc.) and/or further (driver assistance) functions. The vehicle strategy particularly encompasses a power take-up release for the automated vehicle, that is, whether and in which way the automated vehicle is able to make its way through the traffic intersection.

An environment sensor system is to be understood as at least one video and/or at least one radar and/or at least one lidar and/or at least one ultrasonic and/or at least one further sensor, which is/are developed to acquire an environment of a vehicle in the form of environment data values. In one possible embodiment, the sensor system includes a processing unit for this purpose (processor, working memory, hard disk) which includes a suitable software, and/or is connected to such a processing unit.

An environment map is to be understood as a digital representation of the environment, the environment map including a subdivision into grid cells. This means that this environment map is at least partially subdivided into grid cells, and occupancy probabilities and velocity distributions are allocated to each grid cell. The occupancy probabilities represent the probability that a grid cell includes one or more objects (e.g., further road users). The velocity distributions represent the velocities of these objects.

In an advantageous manner, the method according to the present invention may achieve an objective of providing a method for a safe operation of an automated vehicle at a traffic intersection. This objective may be achieved with the aid of the method according to the present invention in that an environment map is prepared based on an acquired environment of the automated vehicle, the environment map including a subdivision into grid cells. These grid cells include occupancy probabilities and velocity distributions, and a driving strategy is determined for the automated vehicle as a function thereof. The driving strategy is particularly determined in such a way that a collision with further road users that are likewise located in the area of the intersection is avoided when passing through the traffic intersection.

The subdividing of the environment into grid cells is preferably implemented in such a way that a first traffic route is subdivided into grid cells along a center line of the first traffic route, the first traffic route intersecting a second traffic route on which the automated vehicle is located in front of the traffic intersection in the driving direction.

In one alternative embodiment of the present invention, for example, the subdivision of the environment into grid cells is implemented along a roadway boundary (roadway marking, construction-type boundary, etc.), especially in those cases where no center line is provided.

A size of the grid cells is preferably specified as a function of a range and/or a measuring accuracy of the environment sensor system.

The occupancy probabilities and the velocity distributions are preferably determined with the aid of recursive probabilistic filters, in particular Bayesian filters.

A device according to the present invention, in particular a control device, is developed to carry out all steps of the method according to the present invention for operating an automated vehicle at a traffic intersection.

To this end, the device particularly includes a processing unit (processor, working memory, memory medium) as well as a suitable software for carrying out a method according to the present invention. In addition, the device includes an interface for emitting and receiving data values with the aid of a wire-bound and/or wireless connection, e.g., to further devices of the automated commercial vehicle (control devices, communication devices, environment sensor system, navigation system, etc.).

In addition, a computer program is provided according to an example embodiment of the present invention, which includes instructions that when a computer executes the computer program, induce this computer to carry out a method according to the present invention for operating an automated vehicle at a traffic intersection. In one example embodiment of the present invention, the computer program corresponds to the software included by the device.

In addition, a machine-readable memory medium is provided according to the present invention on which the computer program is stored.

Advantageous refinements of the present invention disclosed herein.

BRIEF DESCRIPTION OF THE DRAWINGS

Exemplary embodiments of the present invention are shown in the figures and described in greater detail in the following specification.

DETAILED DESCRIPTION OF EXAMPLE EMBODIMENTS

Figure 1:
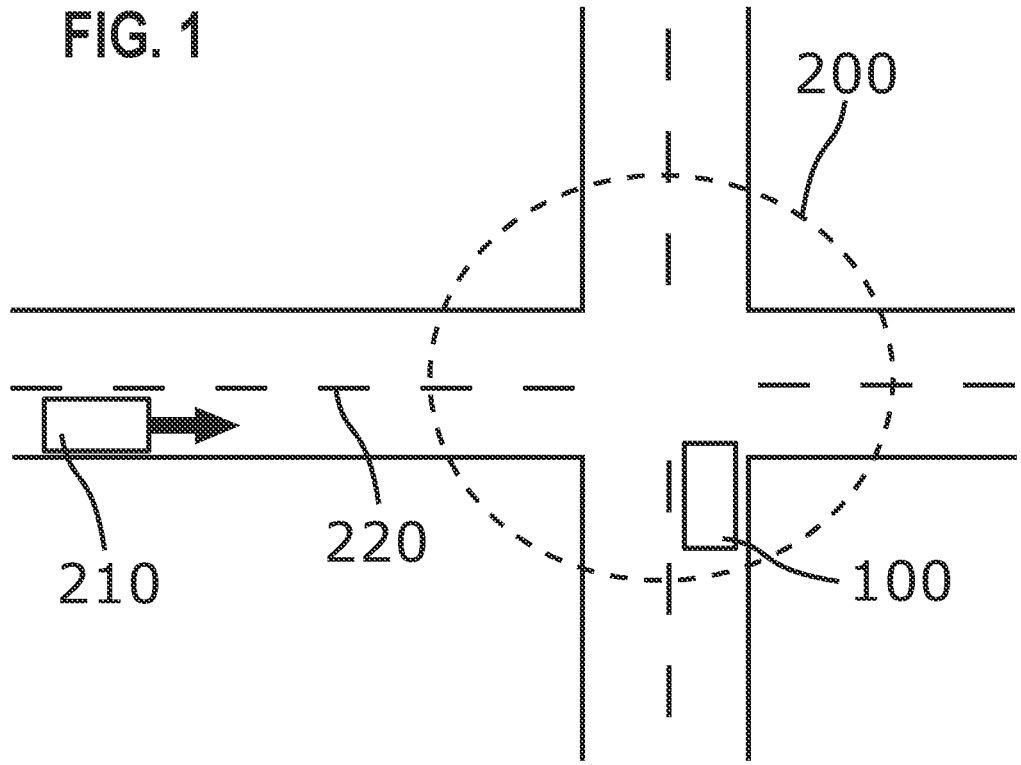
FIG. 1 shows a first exemplary embodiment of the method for operating an automated vehicle according to the present invention.

FIG. 1 shows an exemplary embodiment of method 300 for operating 380 an automated vehicle 100 according to the present invention. Automated vehicle 100 is located in front of a traffic intersection 200 in the driving direction, on a second traffic route 202 which is intersected by a first traffic route 201 purely by way of example. In addition, an object 210, which is moving in the direction of traffic intersection 200, is located on first traffic route 201. In the embodiment shown here, object 210 poses a possible risk to automated vehicle 100 while it is passing through traffic intersection 200.

Figure 2:
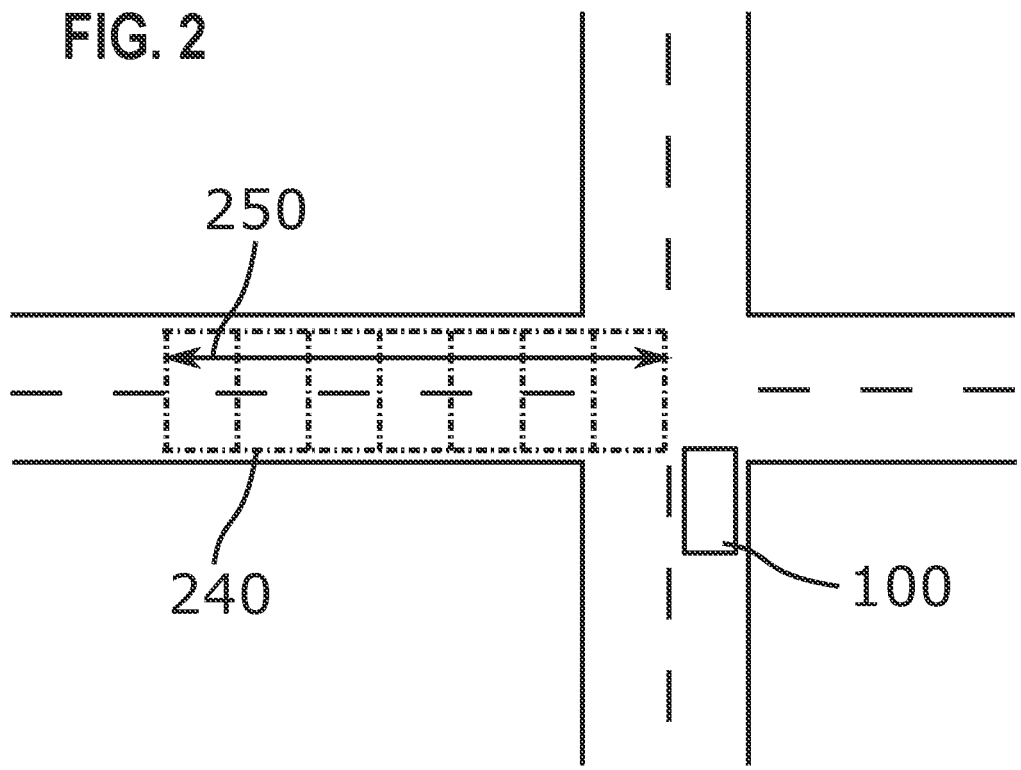
FIG. 2 shows a second exemplary embodiment of the method for operating an automated vehicle according to the present invention.

FIG. 2 shows an exemplary embodiment of an environment map 230. Environment map 230 is prepared based on the acquired environment of automated vehicle 100. Environment map 230 at least partially includes a subdivision into grid cells 240, each grid cell 241-247 including occupancy probabilities and velocity distributions.

In one possible embodiment, the subdividing of the environment into grid cells 240 is implemented in such a way, for example, that first traffic route 202 is subdivided into grid cells 240 along a center line 220 of first traffic route 201. This corresponds to a one-dimensional subdivision of the environment because environment map 230 encompasses grid cells 240 only along one direction—in this instance, along first traffic route 201.

A size of grid cells 240 is specified as a function of a range 250 and/or a measuring accuracy of the environment sensor system of automated vehicle 100, for instance. In one possible embodiment, the size is determined in such a way, for example, that each grid cell 241-247 has approximately the size of a few meters, comparable to the size of a motor vehicle. In a further embodiment, the size is a function of the processing power of the device because an increasing number of grid cells 240 also requires an increase in the processing power.

Figure 3:
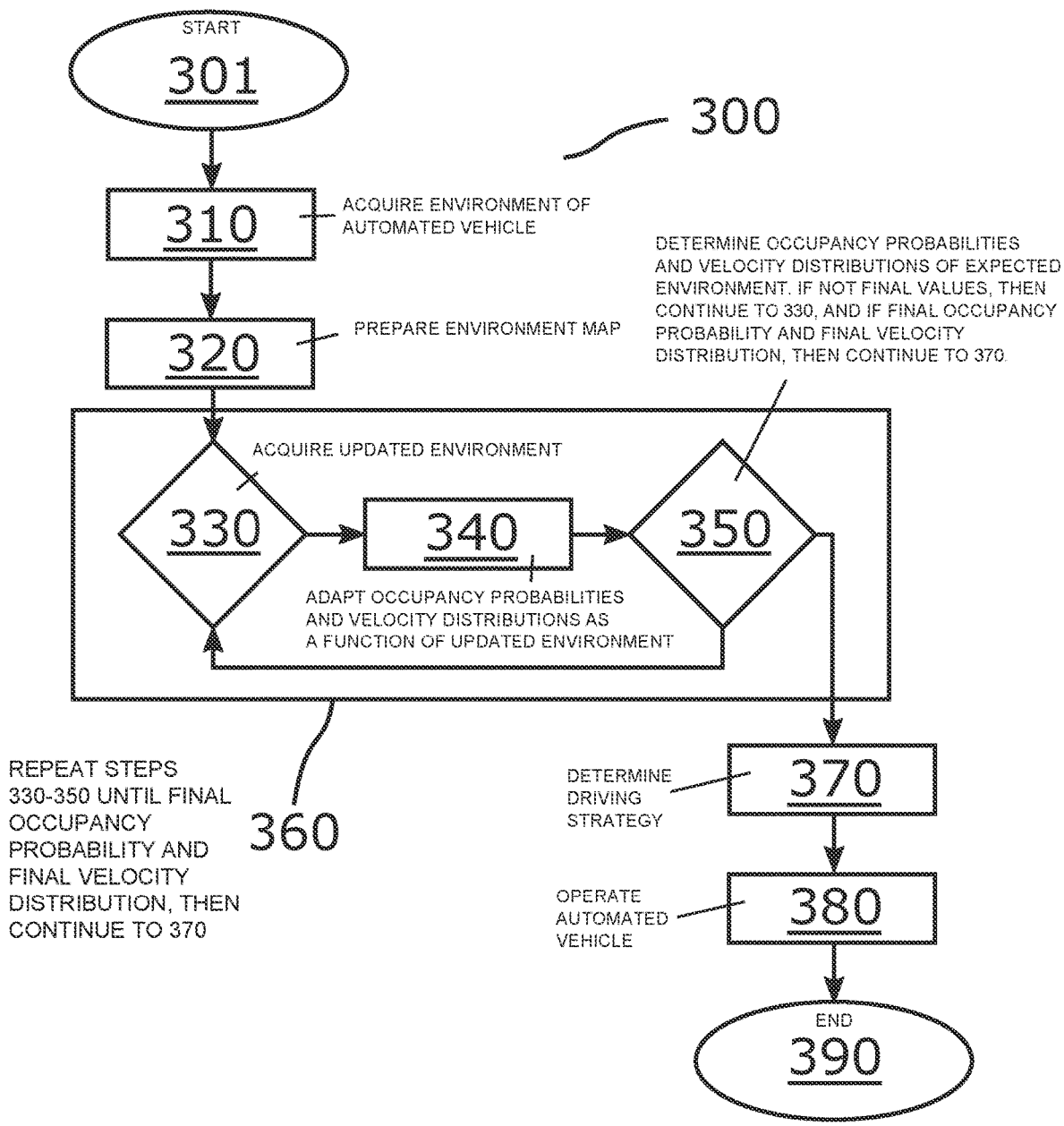
FIG. 3 shows an exemplary embodiment of the method for operating an automated vehicle according to the present invention, in the form of a flow diagram.

FIG. 3 shows a possible exemplary embodiment of a method 300 for operating 380 an autonomous vehicle 100 at a traffic intersection 200.

Method 300 begins in a step 301, for instance in that automated vehicle 100 approaches traffic intersection 200. The fact that automated vehicle 100 is approaching traffic intersection 200 is able to be determined with the aid of an environment sensor system and/or with the aid of a localization device (a navigation system, etc.), for example.

In step 310, an environment of automated vehicle 100 is acquired with the aid of an environment sensor system, the environment including traffic intersection 200.

In step 320, an environment map 230 is prepared on the basis of the acquired environment. Environment map 230 includes a subdivision into grid cells 240, each grid cell 241-247 including occupancy probabilities and velocity distributions.

In step 330, an updated environment of automated vehicle 100 is acquired with the aid of the environment sensor system.

In step 340, the occupancy probabilities and velocity distributions for each grid cell 241-247 are adapted as a function of the updated environment.

In step 350, the occupancy probabilities and the velocity distributions of an expected environment in a next time step are determined for each grid cell 241-247 as a function of the previously adapted occupancy probabilities and the previously adapted velocity distributions.

Step 360 represents a repeated execution of steps 330-350 until a final occupancy probability and a final velocity distribution are determined for each grid cell 241-247 according to predefined criteria.

In step 370, a driving strategy for automated vehicle 100 is determined as a function of the final occupancy probabilities and the final velocity distributions.

In step 380, automated vehicle 100 is operated as a function of the driving strategy.

In step 390, method 300 ends.

What is claimed is:

1. A method for operating an automated vehicle at a traffic intersection, the method comprising:
   a) acquiring an environment of the automated vehicle using an environment sensor system, the environment including the traffic intersection;
   b) preparing an environment map based on the acquired environment, the environment map including a subdivision into grid cells, each of the grid cells including occupancy probabilities and velocity distributions;
   c) acquiring an updated environment of the automated vehicle using the environment sensor system;
   d) adapting the occupancy probabilities and the velocity distributions for each of the grid cells as a function of the updated environment;
   e) determining occupancy probabilities and velocity distributions of an expected environment in a next time step for each of the grid cells as a function of the adapted occupancy probabilities and the adapted velocity distributions;
   repeatedly executing steps c-e until a final occupancy probability and a final velocity distribution, which are determined for each of the grid cells, satisfy predefined criteria;
   determining a driving strategy for the automated vehicle as a function of the final occupancy probabilities and the final velocity distributions; and
   operating the automated vehicle as a function of the driving strategy;
   wherein a size of the grid cells is specified as a function of a measuring accuracy of the environment sensor system, and
   wherein a one-dimensional subdivision of the environment into the grid cells is implemented so that a first traffic route is subdivided into the grid cells along a center line of the first traffic route, and wherein each of the grid cells encompasses adjacent lanes along the center line.

2. The method as recited in claim 1, wherein the first traffic route intersecting a second traffic route on which the automated vehicle is located in front of the traffic intersection in a driving direction.

3. The method as recited in claim 1, wherein a size of the grid cells is also specified as a function of a range of the environment sensor system.

4. The method as recited in claim 1, wherein the occupancy probabilities and the velocity distributions are determined using a recursive probabilistic filter.

5. A control apparatus to operate an automated vehicle at a traffic intersection, comprising:
- a control device, including a processor, configured to perform the following:
  - a) acquire an environment of the automated vehicle using an environment sensor system, the environment including the traffic intersection;
  - b) prepare an environment map based on the acquired environment, the environment map including a subdivision into grid cells, each of the grid cells including occupancy probabilities and velocity distributions;
  - c) acquire an updated environment of the automated vehicle using the environment sensor system;
  - d) adapt the occupancy probabilities and the velocity distributions for each of the grid cells as a function of the updated environment;
  - e) determine occupancy probabilities and velocity distributions of an expected environment in a next time step for each of the grid cells as a function of the adapted occupancy probabilities and the adapted velocity distributions;
  - repeatedly execute c-e until a final occupancy probability and a final velocity distribution, which are determined for each of the grid cells, satisfy predefined criteria;
  - determine a driving strategy for the automated vehicle as a function of the final occupancy probabilities and the final velocity distributions; and
  - operate the automated vehicle as a function of the driving strategy;
- wherein a size of the grid cells is specified as a function of a measuring accuracy of the environment sensor system, and
- wherein a one-dimensional subdivision of the environment into the grid cells is implemented so that a first traffic route is subdivided into the grid cells along a center line of the first traffic route, and wherein each of the grid cells encompasses adjacent lanes along the center line.

6. A non-transitory machine-readable memory medium, on which is stored a computer program, which is executable by a processor, comprising:
- a program code arrangement having program code for operating an automated vehicle at a traffic intersection, by performing the following:
  - a) acquiring an environment of the automated vehicle using an environment sensor system, the environment including the traffic intersection;
  - b) preparing an environment map based on the acquired environment, the environment map including a subdivision into grid cells, each of the grid cells including occupancy probabilities and velocity distributions;
  - c) acquiring an updated environment of the automated vehicle using the environment sensor system;
  - d) adapting the occupancy probabilities and the velocity distributions for each of the grid cells as a function of the updated environment;
  - e) determining occupancy probabilities and velocity distributions of an expected environment in a next time step for each of the grid cells as a function of the adapted occupancy probabilities and the adapted velocity distributions;
  - repeatedly executing steps c-e until a final occupancy probability and a final velocity distribution, which are determined for each of the grid cells, satisfy predefined criteria;
  - determining a driving strategy for the automated vehicle as a function of the final occupancy probabilities and the final velocity distributions; and
  - operating the automated vehicle as a function of the driving strategy;
- wherein a size of the grid cells is specified as a function of a measuring accuracy of the environment sensor system, and
- wherein a one-dimensional subdivision of the environment into the grid cells is implemented so that a first traffic route is subdivided into the grid cells along a center line of the first traffic route, and wherein each of the grid cells encompasses adjacent lanes along the center line.

7. The memory medium as recited in claim 6, wherein a size of the grid cells is also specified as a function of a processing power of the processor.

8. The method as recited in claim 1, wherein the occupancy probabilities and the velocity distributions are determined using a Bayesian filter.

9. The control apparatus as recited in claim 5, wherein a size of the grid cells is also specified as a function of a processing power of the processor.

* * * * *